March 21, 1967 G. E. HUCK ETAL 3,310,074
MEANS FOR CONTROLLING MANUFACTURE OF WIRE CAGES
Filed Dec. 9, 1963 2 Sheets-Sheet 1
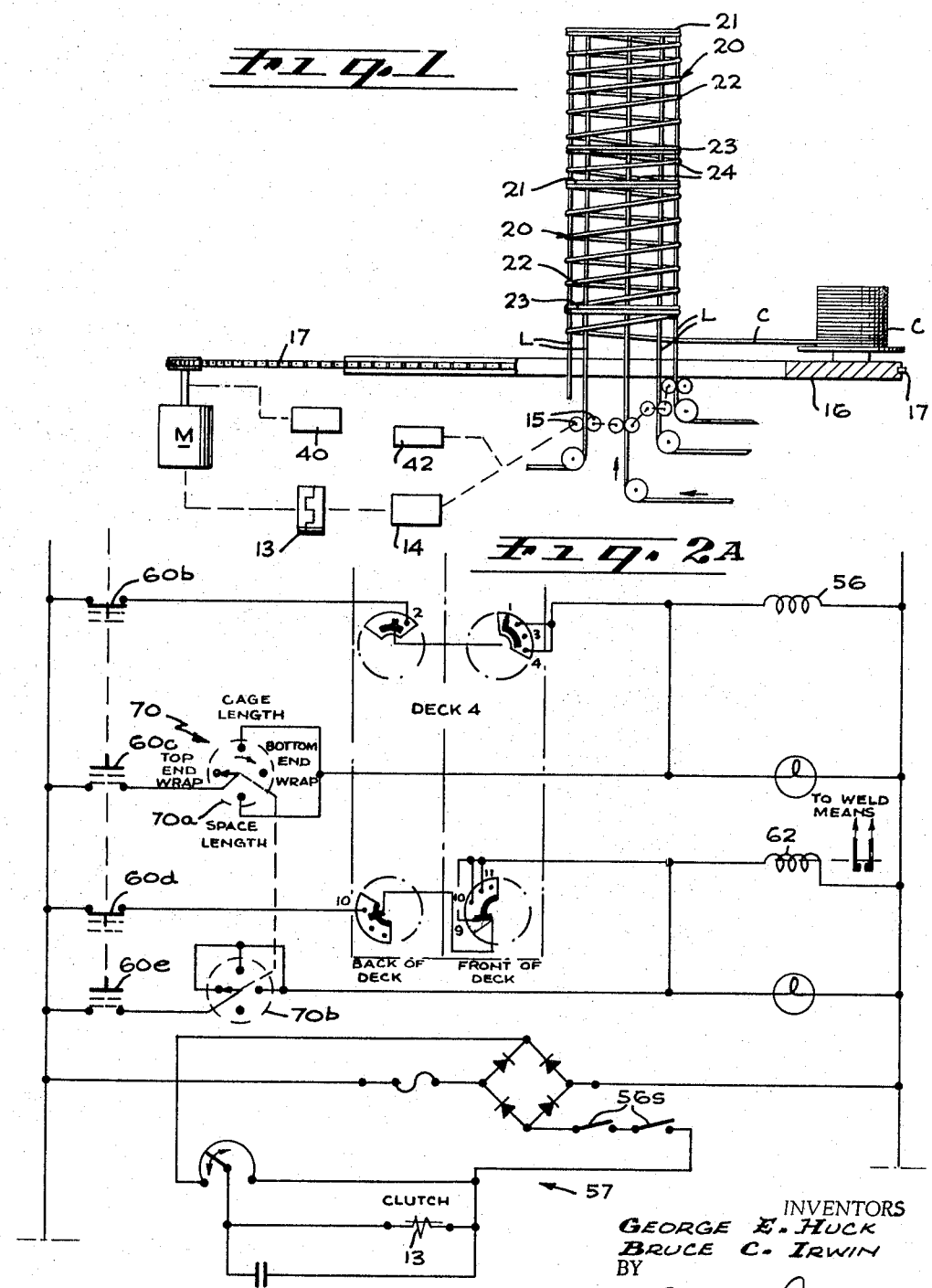
INVENTORS
GEORGE E. HUCK
BRUCE C. IRWIN
BY
Mason & Graham
ATTORNEYS

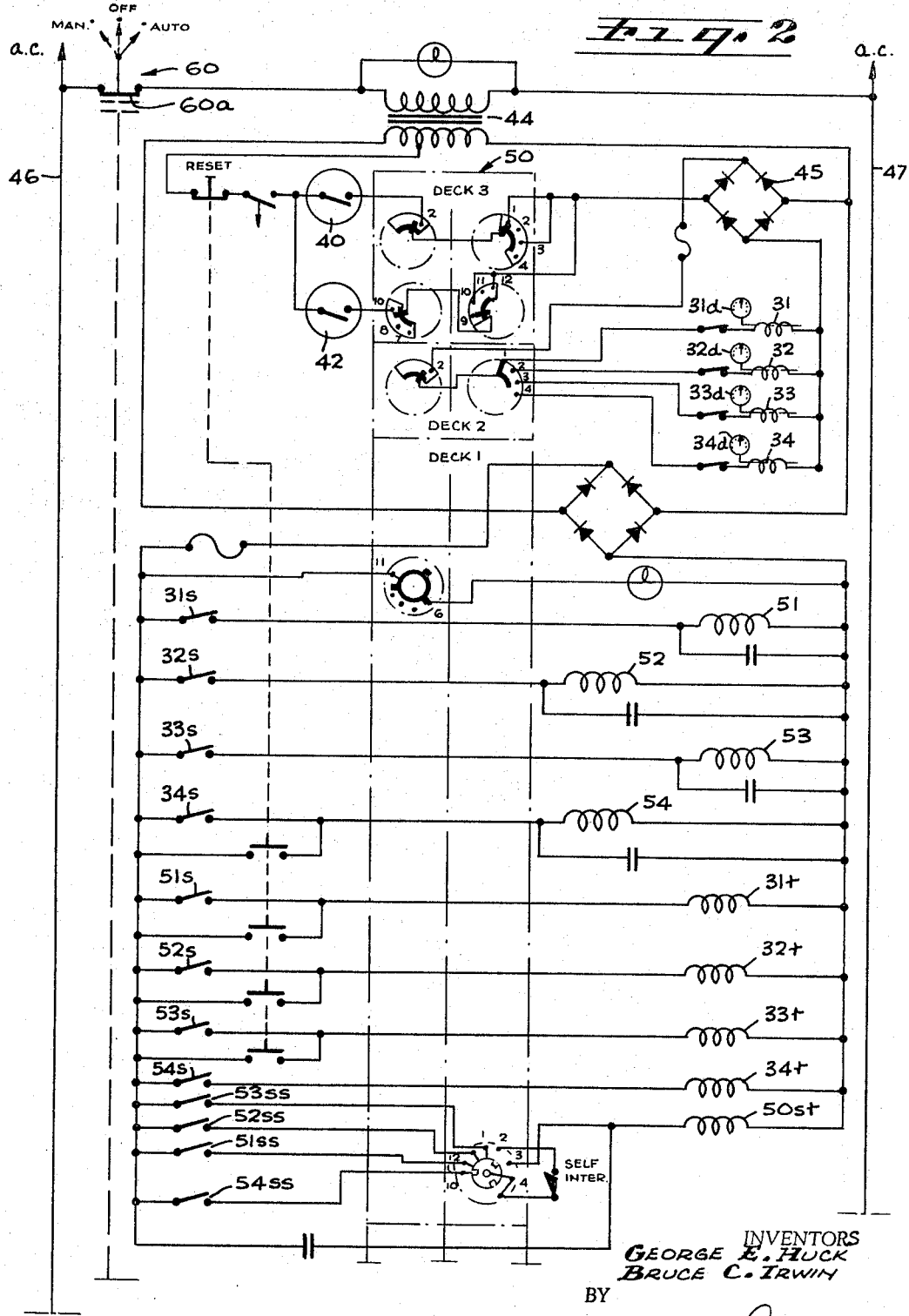

United States Patent Office 3,310,074
Patented Mar. 21, 1967

3,310,074
MEANS FOR CONTROLLING MANUFACTURE
OF WIRE CAGES
George E. Huck, Fullerton, and Bruce C. Irwin, La Mirada, Calif., assignors to American Pipe and Construction Co., Monterey Park, Calif., a corporation of California
Filed Dec. 9, 1963, Ser. No. 329,106
10 Claims. (Cl. 140—112)

This invention has to do generally with the manufacture of wire cages commonly used as reinforcement in concrete pipes, and particularly with means for automatically controlling a machine for making such cages.

Wire cages with which we are concerned are those made by advancing a group of "longitudinal" wires in parallel relation and usually arranged in a circular pattern, the wrapping therearound of one or more wires in a helical pattern and the welding of the intersections of the wrapped wire with the longitudinal wires as the wrapping proceeds. The wrapping may be done either by rotating the group of longitudinal wires as a unit and paying out the wire to be wrapped therearound from a stationary source, or it may be done by causing a supply of the wire to be wrapped to rotate around the group of longitudinal wires.

In the manufacture of wire cages, it is customary to provide one turn of the wire at each end of the cage which is flat or non-helical so that the ends of the completed cage will be square, or normal to the axis of the cage, and in a machine for the continuous manufacture of cages it is customary to make several helical turns of the wire between the cages without welding these turns to the longitudinal wires in order to facilitate severance of the individual cages.

An object of the invention is to provide automatic means for controlling a cage-making machine of the type indicated in order to produce cages of the required length, wrapping pattern and desired spacing therebetween.

More particularly it is an object to provide an automatic control means which can be adjusted or programmed to cause the cage-making machine automatically to produce cages of accurate length and to provide the flexibility to adjust the length of cage, the length of space between cages, and the turns of the flat end wraps of the cage.

These and other objects will be apparent from the drawings and the following description. Referring to the drawings wherein we show one embodiment of the invention:

FIG. 1 is a diagrammatic view of a portion of a cage making machine;

FIG. 2 is an electrical schematic view of the major portion of the control mechanism; and FIG. 2A is a continuation of the bottom portion of FIG. 2.

More particularly describing the invention, referring to FIG. 1, we show diagrammatically one form of cage-making machine wherein longitudinal wires L are driven vertically by a motor M operating through an electromagnetically controlled clutch 13, a variable speed gear reduction means 14 and drive wheels 15 engaging the wires. We also show a turntable 16 which rotates around the upwardly moving wires, being driven by motor M and chain drive 17. The turntable carries a supply of wire C which is wrapped around the upwardly moving longitudinal wires. Appropriate welding means (not shown) is provided for joining the intersections of the longitudinal wires L and the circumferential wire C, and reference is made to the copending application of John C. Silliman and George E. Huck on Improved Machine for Making Wire Cages, Ser. No. 273,154, now Patent No. 3,215,169 as showing one type of welding means which may be used.

Referring now to FIGS. 2 and 2A, for a description of the control means, as previously described, the cages 20 to be formed are provided with a flat end wrap portion 21, a cage body portion 22 wherein the wrapped wire is helically wound, and a bottom end wrap portion 23 which is flat, the intersections of the wires being welded together in each portion. Between cages there are a desired number of loose turns 24 which are not welded to the longitudinal wires so that the successive cages can be readily severed from each other as they are formed.

In order to control automatically the making of the various portions of the cages and the spacing therebetween we provide a presettable counter for each operation required to produce each of the above-described portions of the cage. Standard electrical counters actuated by electrical impulses may be used, such as the Rowan-Type CB-4 manufactured by the Rowan Controller Company, Baltimore, Maryland. Thus each counter has an impulse coil which advances the counter, electrical switch contacts which close when the counter has been advanced to the preset number, and a reset coil and associated mechanism which serves to reset the counter. In the drawings the impulse coils of the counters are designated 31, 32, 33 and 34, respectively, and shown associated with each is a registering dial and pointer designated by a corresponding numeral and the letter "d". Normally open switches or contacts controlled by the counters are designated 31s, 32s, 33s and 34s, respectively. The reset coils are numbered 31r, 32r, 33r and 34r, respectively. Elements having the same numeral are part of the same counter.

The counters are selectively operated or advanced by electrical impulses resulting from the momentary closing of circuits therethrough by pulse switches 40 and 42. The first of these is driven by or in synchronization with the means which rotates the turntable and the other is driven by or in synchronization with the means for driving the longitudinal wires of the cage as appears in FIG. 1. The switches are designed to produce one pulse per unit of travel. Thus in the case of switch 40, this, by closing, produces one pulse per given fraction of turntable revolution, and, in the case of switch 42, this produces one pulse per fractional unit of advance of the longitudinal wires. By way of example, switch 40 can be set to give one pulse per 1/16 of a revolution of the turntable and switch 42 can be set to give one pulse per 1/10 of an inch of travel of the longitudinal wires.

The switches 40 and 42 are connected in parallel with each other between the secondary coil of transformer 44 and a rectifier 45. The counters are connected in parallel and across the rectifier. Conductors 46 and 47 lead to a suitable alternating current source.

A rotary step switch 50 having several decks as indicated on the drawing is used to control many of the circuits. The portions of the step switch in the right half of the area enclosed by the broken lines represent the portions of the front sides of the decks of the switch while the portions in the left half of the area represent the rear sides of the decks. A portion of Deck 3 of the switch is connected between switch 40 and the rectifier and another portion is connected between switch 42 and the rectifier. With the parts in the position shown in the drawing, pulses resulting from closing of switch 40 pass through switch 50 to actuate counter impulse coil 31 after passing through a portion of Deck 2 of switch 50. Thus counter 31, which controls the making of the top end wrap portion 21 of the cage, registers one count or digit per 1/16 of a revolution of the turntable. For example, if this counter is set at 15, the cage makes 15/16 of a revolution after which the counter operates to close its contacts, namely switch 31s.

The closing of switch 31s energizes a relay 51 and this in turn closes a set of its contacts 51s to energize the reset coil 31r. The latter resets the first counter having dial 31d to zero. Relay 51 closes its other set of contacts 51ss to energize the stepping switch relay coil 50sr which serves to advance the step switch one step.

With the parts in the position shown (prior to the first step advancement of switch 50) the longitudinal wires L are stationary by reason of the fact that relay coil 56, which serves to control the clutch circuit 57 through its contacts 56s, is not energized. In this connection it should be noted that a portion of Deck 4 of the step switch 50 is connected in series with relay coil 56 and the source of current.

The above description of operation is based upon the master switch 60 having been positioned for automatic operation as shown in the drawing in which case switches 60a, 60b and 60d would be closed and switches 60c and 60e open. Consequently the welding means, which has not been shown in detail, is operative to effect welding of the wires as the top portion 21 of the cage is made by reason of the fact that the portion of Deck 4 of switch 50 is so positioned as to energize a welding control relay 62.

When the step switch 50 has been advanced one position, the stepping coil 50sr is dropped or deenergized. The advancement of switch 50 brings coil 32 of the second counter which controls the length of the cage body portion 22, into the circuit in series with the longitudinal wire travel counter switch 42 as will be apparent from the position of the switch contacts of Decks 2 and 3 of switch 50, these having been advanced clockwise one position relative to that shown. Also, it should be noted that the rotation counter switch 40 has been disconnected so that only pulses from switch 42 will reach counter coil 32. When the second counter reaches its preset number or predetermined setting it closes its associated switch contacts 32s thereby energizing relay 52 and this in turn closes its contacts or switches 52s and 52ss. The first of these energizes the reset coil 32r which resets the second counter to zero. Switch 52ss serves to complete a circuit through and thereby energize the stepping switch coil 50sr to advance the stepping switch one position.

It will be noted that while the second counter was in operation the welding means also was in operation by reason of the position of Deck 4 of switch 50, and further, that the longitudinal wires were being driven by reason of the completion of a circuit by Deck 4 of switch 50 through the relay 56 controlling the clutch.

Upon the advancement of the stepping switch 50 to the next position (as Deck 3 of the switch is viewed the armature will be upon the third contact) and therefore the rotation counter switch 40 is brought into play for the purpose of actuating the third counter which has impulse coil 33. It will also be noted that counter switch 42 is not in the circuit. Also, with the advancement of the switch the longitudinal wire travel clutch relay 56 is deenergized so that the clutch is disengaged and the longitudinal wires are not driven. Consequently the wire is wrapped circularly around the longitudinal wires to form the bottom end 23 of the cage. When the third counter reaches its preset figure, it closes its associated switch 33s, thereby energizing relay 53 and this in turn closes contacts 53s and 53ss. The latter energizes relays 33r resetting the counter to zero. Closing of contacts 53s energizes the stepping relay 50sr to cause the advancement of the step switch 50 one position. With such advancement the weld means is taken out of operation by the deenergization of the weld control relay 62. Thus the machine wraps wire around the longitudinal wires without welding the intersections to form the spacing sections 24 between the adjacent ends 21 and 23 of cages. When the preset number of impulses is received by the last counter, it closes its switch 34s to energize relay 54 and this, in turn, closes it associated contacts 54s and 54ss. The first of these resets the counter through energization of coil 34r and the second energizes the advancing coil 50sr of the step switch 50 to advance the same to the next position, which is the same as that shown in the drawing. Thus the first counter is again brought into operation to control the making of the top end wrap 21 of the next cage to be formed and the various operations are repeated automatically.

It is sometimes necessary or desirable to control the machine manually and for this purpose the master switch 60 can be moved to the manual position in which case switches 60c and 60e are closed and switches 60a, 60b and 60d are open. This bring into operation a manually operable four-position switch 70 having sections 70a and 70b. Movement of switch 70 to "top end rap" position energizes only relay 62 through section 70b of the switch, thereby producing welds without cage travel, that is, the longitudinal wires L are not driven. When switch 70 is turned to "cage length" position, relay 56 is energized through section 70a of the switch and relay 62 is energized through section 70b of the switch. Thus the longitudinal wires L are driven and the welding means is in operation.

We claim:

1. In means for controlling apparatus for making wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the intersections of the circumferential wire with the longitudinal wires, a first sensing means for incrementally sensing the travel distance of said wire wrap means, a second sensing means for incrementally sensing the travel distance of said wire drive means, presettable adjustable means operable in response to said first and second sensing means to interrupt automatically the operation of the wire drive means in a predetermined sequence and for predetermined times in relation to the travel of said wire wrap means.

2. In means for controlling apparatus for making wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the intersections of the circumferential wire with the longitudinal wires, a first sensing means for incrementally sensing the travel distance of said wire wrap means, a second sensing means for sensing the travel distance of the longitudinal wires, presettable adjustable means operable in response to said second sensing means to interrupt automatically the operation of the wire drive means, and presettable adjustable operable thereafter in response to said first sensing means to initiate the operation of the wire drive means.

3. In means for controlling apparatus for making wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the intersections of the circumferential wire with the longitudinal wires, a first sensing unit for sensing the travel distance of said wire wrap means, a second sensing unit for sensing the travel distance of said wire drive means, a plurality of electric counter units, multiple switch means for selectively connecting said counter units to certain of said sensing units one at a time, switch advancing means, said counter units being operable individually to initiate operation of said switch advancing means, a control circuit for said wire drive means operable to render said drive effective or ineffective, and a control circuit for said welding means, said multiple switch means being included in the control circuits for said welding means and said wire drive means.

4. Means for controlling apparatus fo rmaing wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the intersections of the circumferential wire with the longitudinal wires, comprising a relay-controlled control circuit for said wire drive means, a relay-controlled control circuit for said welding means, a plurality of electrical counters, a source of current, a first pulse switch driven in synchronism with said wire wrap means, a second pulse switch driven in synchronism with said wire drive means, a step switch connected in series with said pulse switches, said counters and said source of current, whereby, in certain positions of said step switch one of said pulse switches is connected to one of said counters and in other positions thereof the other of said pulse switches is connected to one other of said counters, said counters being effective, upon reaching a predetermined setting, to advance said step switch, said step switch being connected to energize the relays of said relay-controlled control circuits in certain positions thereof.

5. Control means for a machine having a prime mover and at least two power trains driven thereby and a clutch means in at least one of the power trains, a source of electric current, at least a pair of counters actuatable by an electric pulse, a first pulse switch driven in synchronism with one of said power trains, a second pulse switch driven in synchronism with the other power train, a step switch connected in an electric circuit including said counters, said source of current and said pulse switches, whereby, in certain positions of said step switch one of said pulse switches is connected to one of said counters and in certain other positions thereof the other of said pulse switches is connected to one of said counters, switch advancing means for said step switch, said counters being effective to initiate operation of the switch advancing means, and at least one control circuit controlled by said step switch.

6. The control means set forth in claim 5 in which electric control means is provided for said clutch means including a relay controlled by said step switch.

7. The control means set forth in claim 5 in which electric control means is provided for said clutch means including a relay controlled by said step switch, in which an operation performing device is provided having an electric control circuit including a relay controlled by said step switch.

8. In means for controlling apparatus for making wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the inter-sections of the circumferential wire with the longitudinal wires, a first pulse switch driven in synchronism with said wire wrap means, a second pulse switch driven in synchronism with said wire drive means, an electric current source, a plurality of electric pulse-operated counters, multiposition switch means for selectively connecting said pulse switches with one of said counters, and the current source, a control circuit for said welding means, a control circuit for rendering said wire drive means effective or ineffective, means for advancing said multiposition switch including a circuit controlled by said multiposition switch and rendered effective by the individual counters, said control circuits for said welding means and said wire drive means being controlled by said multiposition switch.

9. The control means set forth in claim 8 in which said counters are adjustably presettable and in which said counters are automatically resettable.

10. In means for controlling apparatus for making wire cages wherein the apparatus includes wire drive means for advancing a group of longitudinal wires in parallel relation and in a given pattern, wire wrap means for causing a circumferential wire to be wrapped around said longitudinal wires as the same are advanced, and welding means for joining the intersections of the circumferential wire with the longitudinal wires, a source of electric current, a plurality of electric pulse-operated counters, a relay controlled by each counter and adapted to be energized when the counter reaches a predetermined setting, counter reset means for each counter controlled by its respective relay, a first pulse switch driven in synchronism with said wire wrap means, a second pulse switch driven in synchronism with said wire drive means, multiposition switch means connected between the pulse switches and said counters and in series therewith and said source of current, said multiposition switch means selectively connecting said pulse switches with one of said counters, means for advancing said multiposition switch means including a coil connected to said source of current and controlled by said relays and by said multiposition switch means, means for rendering the wire drive means ineffective controlled by said multiposition switch means, and means for rendering said weld means ineffective controlled by said multiposition switch means.

References Cited by the Examiner

UNITED STATES PATENTS

| | | | |
|---|---|---|---|
| 2,050,832 | 8/1936 | Edwards | 140—112 |
| 2,964,252 | 12/1960 | Rosenberg | 318—20.320 |
| 3,125,123 | 3/1964 | Knisely | 140—112 |
| 3,231,801 | 1/1966 | Lang | 310—49 |

CHARLES W. LANHAM, *Primary Examiner.*

L. A. LARSON, *Assistant Examiner.*